(12) United States Patent
Miyazono et al.

(10) Patent No.: US 11,513,769 B2
(45) Date of Patent: Nov. 29, 2022

(54) DATA ACQUISITION SYSTEM, INPUT DEVICE, DATA ACQUISITION APPARATUS, AND DATA COMBINING APPARATUS

(71) Applicant: Yokogawa Electric Corporation, Musashino (JP)

(72) Inventors: Shinichi Miyazono, Tokyo (JP); Miyuki Kuwabara, Tokyo (JP); Tsuyoshi Tsuchiya, Tokyo (JP)

(73) Assignee: Yokosawa Electric Corporation, Musashino (JP)

( * ) Notice: Subject to any disclaimer, the term of this patent is extended or adjusted under 35 U.S.C. 154(b) by 650 days.

(21) Appl. No.: 16/365,013

(22) Filed: Mar. 26, 2019

(65) Prior Publication Data
US 2019/0303101 A1 Oct. 3, 2019

(30) Foreign Application Priority Data
Mar. 30, 2018 (JP) .............................. JP2018-070000

(51) Int. Cl.
*G06F 7/14* (2006.01)
*G06F 16/11* (2019.01)
(Continued)

(52) U.S. Cl.
CPC .............. *G06F 7/14* (2013.01); *G06F 16/11* (2019.01); *H04W 4/38* (2018.02)

(58) Field of Classification Search
CPC .. G06F 7/14; G06F 16/11; H04W 4/38; H04L 67/12
See application file for complete search history.

(56) References Cited

U.S. PATENT DOCUMENTS

2002/0035559 A1* 3/2002 Crowe .............. G06F 16/24564
2008/0071899 A1 3/2008 Odaka et al.
(Continued)

FOREIGN PATENT DOCUMENTS

JP 2006-155135 A 6/2006
JP 2008-71157 A 3/2008

OTHER PUBLICATIONS

Technical Information, Data acquisition system introduction to the various features of the GM, TI 04L55B01-01JA, Jun. 26, 2017, 3rd edition (YK), Yokogawa Electric Corporation, retrieved on Mar. 1, 2018, Internet<URL:https://y-link.yokogawa.com/download/document/ti/TI04L55B01-01JA.pdf, pp. 148.

*Primary Examiner* — Robert W Beausoliel, Jr.
*Assistant Examiner* — Mohammad S Bhuyan
(74) *Attorney, Agent, or Firm* — Sughrue Mion, PLLC

(57) ABSTRACT

A data acquisition system according to an embodiment includes an input device, a data acquisition apparatus, and a data combining apparatus. The input device includes a data measurer configured to acquire measurement data by performing measurement, generate sequence information representing a sequence of the acquired measurement data, and transmit the measurement data and the sequence information to the data acquisition apparatus. The data acquisition apparatus includes a data collector configured to, when receiving the measurement data and the sequence information, generate time information, and when failing to receive the measurement data and the sequence information, generate data loss information. The data combining apparatus includes a data combiner configured to acquire data from the input device and the data acquisition apparatus, collate the sequence information therein, and replace the data loss information with the measurement data in the data obtained from the input device, thereby generating combined data.

20 Claims, 11 Drawing Sheets

(51) Int. Cl.
*H04W 4/38* (2018.01)
*H04L 67/12* (2022.01)

(56) References Cited

U.S. PATENT DOCUMENTS

| | | | | |
|---|---|---|---|---|
| 2012/0117500 | A1* | 5/2012 | Maim | G06F 40/18 |
| | | | | 715/769 |
| 2012/0221715 | A1* | 8/2012 | Hamada | H04L 67/22 |
| | | | | 709/224 |
| 2013/0262013 | A1* | 10/2013 | Ide | G01S 19/13 |
| | | | | 702/108 |
| 2015/0318872 | A1* | 11/2015 | Mani | H04M 7/0084 |
| | | | | 714/774 |
| 2019/0095506 | A1* | 3/2019 | Challagolla | G06F 16/252 |

* cited by examiner

FIG. 2

(1) INTERNAL MEMORY (OF INPUT DEVICE)
- DATA SEQUENCE NUMBER
- MEASUREMENT DATA (2) INTERNAL MEMORY (OF RECORDING DEVICE)
- DATA TIME
- DATA SEQUENCE NUMBER
- MEASUREMENT DATA
- DATA LOSS PERIOD (START TIME, END TIME)

(3) RECORDED DATA FILE (OF RECORDING DEVICE)
- DATA TIME
- INPUT DEVICE IDENTIFICATION INFORMATION
- DATA SEQUENCE NUMBER
- MEASUREMENT DATA
- DATA LOSS PERIOD (START TIME, END TIME)

(4) RECORDED DATA FILE (OF INPUT DEVICE)
- INPUT DEVICE IDENTIFICATION INFORMATION
- DATA SEQUENCE NUMBER
- MEASUREMENT DATA

\* TIME IS NOT INCLUDED (5) COMBINED DATA FILE
- DATA TIME
- INPUT DEVICE IDENTIFICATION INFORMATION
- DATA SEQUENCE NUMBER
- (COMBINED) MEASUREMENT DATA
- DATA LOSS PERIOD (START TIME, END TIME)

FIG. 7

| (B) INTERNAL MEMORY OF RECORDING DEVICE | | | | (A) INTERNAL MEMORY OF INPUT DEVICE | |
|---|---|---|---|---|---|
| DATA TIME | DEVICE IDENTIFI- CATION | CH1 DATA | CH2 DATA | DATA SEQUENCE NUMBER | MEASUREMENT DATA |
| | | | | 1 | 23.5°C |
| | | | | | |
| | | | | | |
| | | | | | |
| | | | | | |
| | | | | | |

FIG. 8

| (B) INTERNAL MEMORY OF RECORDING DEVICE | | | | (A) INTERNAL MEMORY OF INPUT DEVICE | |
|---|---|---|---|---|---|
| DATA TIME | DEVICE IDENTIFI- CATION | CH1 DATA | CH2 DATA | DATA SEQUENCE NUMBER | MEASUREMENT DATA |
| 00:00:01 | DEVICE A | 1 | 23.5°C | 1 | 23.5°C |
| | | | | | |
| | | | | | |
| | | | | | |
| | | | | | |
| | | | | | |

FIG. 9

| (B) INTERNAL MEMORY OF RECORDING DEVICE | | | | (A) INTERNAL MEMORY OF INPUT DEVICE | |
|---|---|---|---|---|---|
| DATA TIME | DEVICE IDENTIFI-CATION | CH1 DATA | CH2 DATA | DATA SEQUENCE NUMBER | MEASUREMENT DATA |
| 00:00:01 | DEVICE A | 1 | 23.5°C | 1 | 23.5°C |
| 00:00:02 | DEVICE A | 2 | 24.7°C | 2 | 24.7°C |
|  |  |  |  |  |  |
|  |  |  |  |  |  |
|  |  |  |  |  |  |
|  |  |  |  |  |  |

FIG. 10

| (B) INTERNAL MEMORY OF RECORDING DEVICE | | | | (A) INTERNAL MEMORY OF INPUT DEVICE | |
|---|---|---|---|---|---|
| DATA TIME | DEVICE IDENTIFI-CATION | CH1 DATA | CH2 DATA | DATA SEQUENCE NUMBER | MEASUREMENT DATA |
| 00:00:01 | DEVICE A | 1 | 23.5°C | 1 | 23.5°C |
| 00:00:02 | DEVICE A | 2 | 24.7°C | 2 | 24.7°C |
| 00:00:03 | DEVICE A | DATA LOSS | DATA LOSS | 3 | 24.0°C |
| 00:00:04 | DEVICE A | DATA LOSS | DATA LOSS | 4 | 24.3°C |
|  |  |  |  |  |  |
|  |  |  |  |  |  |

FIG. 11

(B) INTERNAL MEMORY OF RECORDING DEVICE

| DATA TIME | DEVICE IDENTIFICATION | CH1 DATA | CH2 DATA |
|---|---|---|---|
| 00:00:01 | DEVICE A | 1 | 23.5°C |
| 00:00:02 | DEVICE A | 2 | 24.7°C |
| 00:00:03 | DEVICE A | DATA LOSS | DATA LOSS |
| 00:00:04 | DEVICE A | DATA LOSS | DATA LOSS |
| 00:00:05 | DEVICE A | 5 | 23.9°C |
|  |  |  |  |

(A) INTERNAL MEMORY OF INPUT DEVICE

| DATA SEQUENCE NUMBER | MEASUREMENT DATA |
|---|---|
| 1 | 23.5°C |
| 2 | 24.7°C |
| 3 | 24.0°C |
| 4 | 24.3°C |
| 5 | 23.9°C |
|  |  |

DATA ACQUISITION SYSTEM, INPUT DEVICE, DATA ACQUISITION APPARATUS, AND DATA COMBINING APPARATUS

BACKGROUND OF THE INVENTION

Field of the Invention

The present invention relates to a data acquisition system, an input device, a data acquisition apparatus, and a data combining apparatus.

The present application claims priority based on Japanese Patent Application No. 2018-070000 filed on Mar. 30, 2018, the contents of which are incorporated herein by reference.

Description of Related Art

In facilities such as plants and factories, a data acquisition system is used to collect and store measurement data. The main devices that make up the data acquisition system are, for example, an input device and a recorder. Here, the recorder is an example of a data acquisition apparatus.

The input device measures field data such as voltage and temperature at a predetermined cycle and holds the measurement value until the next measurement. The measurement data such as measurement values are automatically sent to the recorder after the input device has measured, or the recorder gathers the measurement data via communication and the recorder displays and records the measurement data. Therefore, the input device itself does not need to have a function to measure time (real time clock), a function for managing time, and a function for storing measurement data. Therefore, it is impossible to later retrieve the measurement data from the input device, or to check the measurement data by operating the input device or the like, using a device such as a personal computer (PC), for example.

The recorder collects the measurement data transmitted from the input device, writes the measurement data into its own memory, and then saves the measurement data as recorded data. However, the recorder does not manage which input device the saved recording data was sent from.

A data acquisition apparatus saving measurement data in an internal memory and automatically saving the measurement data in an external medium is disclosed in the following literature:

"1.1.3 Reliably saving recorded data" on pages 1 to 4 of Technical Information, Introduction of various functions of data acquisition system GM, TI 04L55B01-01JA, Jun. 26, 2017, 3rd edition (YK), TI 04L55B01-01JA, Yokogawa Electric Corporation, [Searched on Mar. 1, 2018], the Internet <URL:https://y-link.yokogawa.com/download/document/ti/TI04L55B01-01JA.pdf>

In the system configuration as described above, in a case where an abnormal event such as communication abnormality occurs in a case where the recorder collects the measurement data, measurement data may not be collected. Also, recorded data is lost during the period in which the recorder cannot collect the measurement data.

A method of duplexing recorders has also been used so as to later find what kind of state the measurement data of an input device was in a period in which measurement data was missing. In the duplexing method, for example, using the two recorders, measurement data obtained in one of the input devices is collected and stored in both of the two recorders. Therefore, in a case where a measurement data loss time period occurs in one of the recorders, measurement data during that period could be found later with the other of the recorders.

In the prior art, in a case where the recorders are duplexed described above, an example of processing procedure in each of the devices is as follows. The two recorder are referred to as a recorder A and a recorder B for the sake of convenience.

The input device measures the field data at a predetermined timing. The input device then sends measurement data to each of the recorder A and the recorder B. Thereafter, when the measurement timing comes again, the input device measures the field data again. Hereinafter, the above will be repeated.

On the other hand, the recorder A receives the measurement data transmitted from the input device. Then, the recorder A writes the measurement data received from the input device into its own memory and holds the measurement data. At this time, the recorder A writes the time when measurement data was received into the memory in a form related to the measurement data by referring to the timekeeping function managed by itself. Thereafter, the recorder A repeats receiving measurement data from the input device and saving the received measurement data. At a certain timing, due to an abnormal state, the recorder A cannot receive measurement data from the input device. This causes loss of measurement data in the recorder A. After the abnormal situation is resolved, the recorder A resumes reception of measurement data from the input device and storage of the measurement data. Finally, the recorder A stores the measurement data, which is to be saved, into a data file, and ends the processing.

Also, like the recorder A, the recorder B receives the measurement data transmitted from the above input device. Then, the recorder B writes the measurement data received from the input device into its own memory and holds the measurement data. The recorder B also writes the time at the time of reception of the measurement data into the memory in association with the measurement data by referring to the timekeeping function managed by the recorder B itself.

In the recorder B, no abnormal condition like that occurred in recorder A occurs, Therefore, the measurement data loss does not occur in the recorder B. Thereafter, the recorder B repeats the reception of the measurement data from the input device and the storage of the received measurement data. Finally, the recorder B stores the measurement data, which is to be saved, into a data file, and ends the processing.

In a case where the input device, the recorder A, and the recorder B perform the above processing, the administrator of the data acquisition system can collate the data file generated by the recorder A with the data file generated by the recorder B. As a result, the administrator collates the time and the measurement data recorded in each data file with each other, and recognizes that there is a measurement data loss period in the recorder A. In addition, the administrator can supplement measurement data missing in the data file of the recorder A from the data file of the recorder B.

The input device itself does not have a means for confirming the measurement data later. That is, the input device itself does not have a memory for storing measurement data, for example. Therefore, in order to be able to confirm the situation even after a measurement data loss period occurs in a certain recorder, it was necessary to multiplex the data acquisition system with at least another recorder. As a result, the cost of the system increased.

The measurement data sent from the input device to the recorder is not associated with a time. For this reason, time management relating to measurement data is exclusively dependent on the recorder side. Therefore, in a case where recorders are duplexed, it was necessary to strictly synchronize the real time clock between those two recorders in a scene where time consistency between the two recorders is strictly required. As a result, a burden was imposed on the functional configuration of the data acquisition system and the labor of maintenance and management.

The recorder does not have the function of detecting the loss of measurement data. Therefore, in order to detect data loss, the administrator had to compare data files outputted by multiple recorders with each other after the incident.

Even in the case of multiplexing recorder, there is a possibility that data loss may occur simultaneously in all multiplexed recorder. In this case, the administrator cannot complement the data missing part from the data of the recorders. Here, the main cause of occurrence of data loss is due to communication error between the input device and the recorder. In the case of wired communication, the frequency of occurrence of communication errors is extremely lower than in the case of wireless communication, so that data defects rarely occur simultaneously in all of the multiplexed recorders. However, in recent years, with the introduction of wireless communication into the input devices, the frequency of communication errors between the input device and the recorder becomes higher than before, so that data loss could really occur simultaneously in all of the multiplexed recorders. Therefore, the effect of multiplexing is becoming poorer than in the case of conventional wired communication.

As described in the prior art, when any abnormality occurs between the input device and the recorder, a measurement data loss period occurs on the recorder side. As a need for the data acquisition system, there is a need to collect measurement data without missing data. Furthermore, there is a need to complement measurement data that could not be acquired if there is a measurement data missing period. Furthermore, there is also a need to know the situation of measurement data in the measurement data loss period. However, the prior art has the following problems.

As already described with respect to the prior art, multiplexing the recorder has mainly a cost problem. Therefore, in preparation for data loss on the recorder side, it is conceivable to provide a memory in the input device and store measurement data and time information in the memory in association with each other. However, for that purpose, it is necessary for the input device to have a real time clock function. However, in order to realize the function of the real time clock on the input device side, it is necessary to solve various problems such as cost of electronic parts, placement restriction on the circuit board of the input device, power consumption during operation, and the like. In particular, increasing the cost of an inexpensive input device is a big problem.

SUMMARY OF THE INVENTION

A data acquisition system according to as aspect includes an input device, a data acquisition apparatus, and a data combining apparatus. The input device includes a data measurer configured to acquire measurement data by performing measurement, generate sequence information representing a sequence of the acquired measurement data, and transmit the measurement data and the sequence information to the data acquisition apparatus, and a first storage configured to store, as first data, the measurement data and the sequence information in association with each other. The data acquisition apparatus includes a data collector configured to, when the data collector receives the measurement data and the sequence information from the input device, generate time information in association with the measurement data and the sequence information, and when the data collector fails to receive a pair of the measurement data and the sequence information from the input device, generate data loss information indicating that the measurement data and the sequence information could not be received from the input device, and a second storage configured to store, as second data, the measurement data and the sequence information in association with the time information, and store the data loss information passed from the data collector. The data combining apparatus includes a data combiner configured to acquire the first data stored in the first storage, acquire the second data stored in the second storage, collate the sequence information included in the first data and the sequence information included in the second data, and replace the data loss information with the measurement data in the first data associated with a result of the collation, thereby generating combined data obtained by combining the first data and the second data. Further features and aspects of the present disclosure will become apparent from the following detailed description of exemplary embodiment with reference to the attached drawings.

BRIEF DESCRIPTION OF THE DRAWINGS

FIG. 2 is a schematic diagram illustrating overview of data configuration of (1) an internal memory in an input device, (2) an internal memory in a recorder, (3) a recorded data file output from the recorder, (4) a recorded data file with measurement data obtained from the input device, and (5) a combined data file according to the embodiment.

FIG. 7 is a schematic diagram illustrating a state of internal memories of the input device and the recorder in a first situation according to the embodiment.

FIG. 8 is a schematic diagram illustrating a state of the internal memories of the input device and the recorder in a second situation according to the embodiment.

FIG. 9 is a schematic diagram illustrating a state of the internal memories of the input device and the recorder in a third situation according to the embodiment.

FIG. 10 is a schematic diagram illustrating a state of the internal memories of the input device and the recorder in a fourth situation according to the embodiment.

FIG. 11 is a schematic diagram illustrating a state of the internal memories of the input device and the recorder in a fifth situation according to the embodiment.

DETAILED DESCRIPTION OF THE INVENTION

The embodiments of the present invention will be now described herein with reference to illustrative preferred embodiment. Those skilled in the art will recognize that many alternative preferred embodiment can be accomplished using the teaching of the present invention and that the present invention is not limited to the preferred embodiment illustrated herein for explanatory purposes.

According to an aspect of the present disclosure, a data acquisition system can be realized at low cost that, even when the measurement data is lost due to an abnormal event or the like in communication from the measurement point to the recorder, the data acquisition system can later supplement lost measurement data.

First Embodiment

The first embodiment of the present invention will now be described with reference to the drawings.

Figure 1:
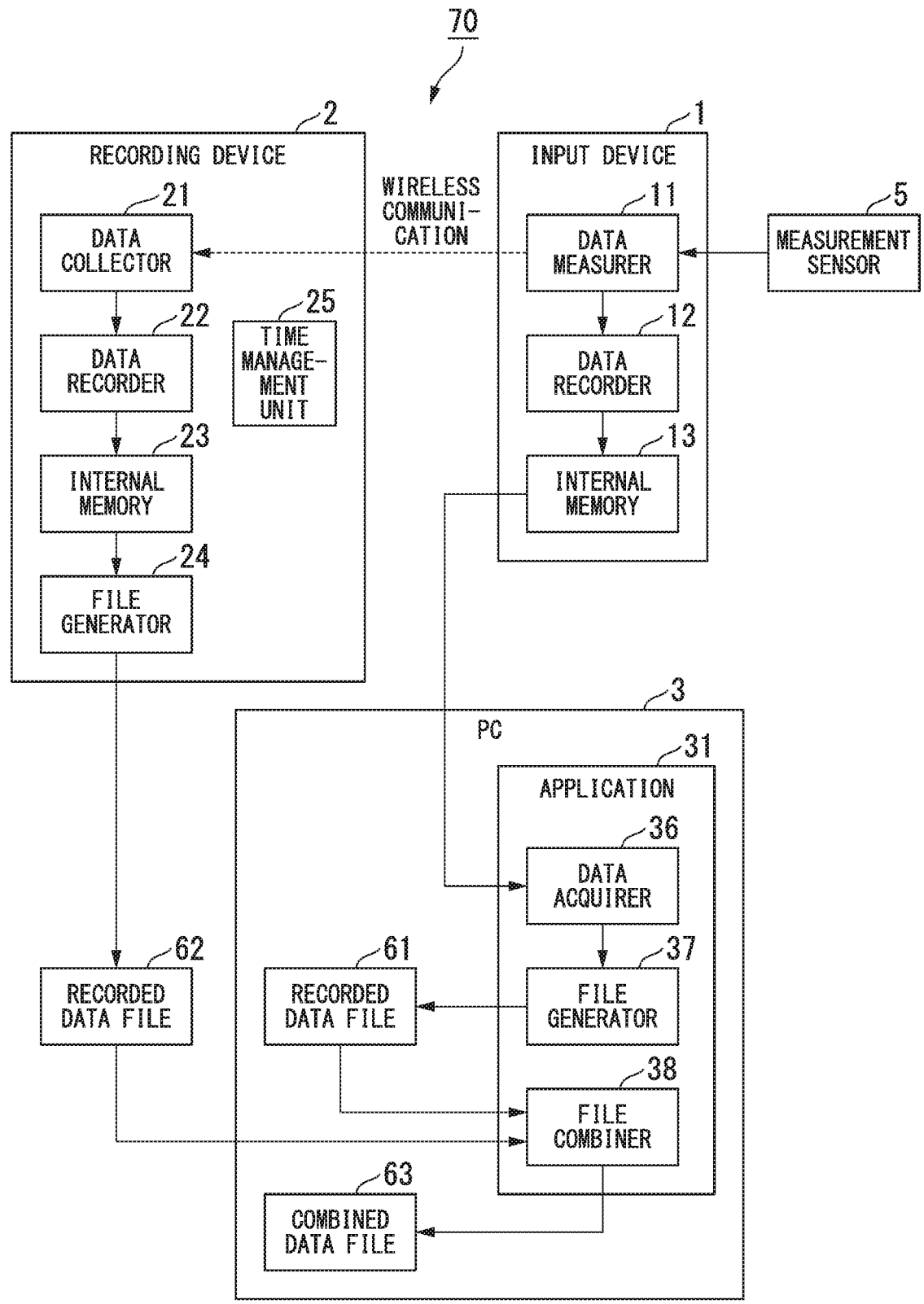
FIG. 1 is a functional block diagram illustrating a schematic functional configuration of a data acquisition system according to a first embodiment of the present invention.

FIG. 1 is a functional block diagram illustrating a schematic functional configuration of a data acquisition system according to the present embodiment. As illustrated in FIG. 1, a data acquisition system 70 includes an input device 1, a recorder 2, and a PC (personal computer) 3. Although only one input device 1 is illustrated in FIG. 1, the data acquisition system 70 may have a plurality of input devices 1.

By using a measurement sensor 5, the input device 1 measures various physical quantities within a facility such as a plant. That is, input device 1 is a device for industrial measurement. The input device 1 measures, for example, voltage, current, power, magnetism, temperature, humidity, pressure, velocity, fluid flow rate, and liquid volume. However, the target to be measured by input device 1 is not limited to those listed here. Since the measurement sensor 5 itself is realized by using existing technology, a detailed explanation will be omitted here. The input device 1 transmits the measured data to the recorder 2 by communication (for example, wireless communication). The wireless communication may be, for example, Low-Power Wide-Area Network (LPWAN). Also, the input device 1 writes and stores the measured data in internal storage means. As will be described later, the measurement data written in the internal storage means can be taken out from the PC 3. That is, measurement data in the input device 1 can be confirmed from the PC 3 side. The input device 1 performs measurement, for example, at preset time intervals (for example, every second), and generates a data serial number (sequence information) representing the order of the measurement data. The data serial number is a number that increases by 1 with every measurement. In the input device 1, when the measurement data is transmitted to the recorder 2, the data serial number is transmitted together. The input device 1 also records data serial numbers when writing measurement data in internal storage means.

The recorder 2 is an example of a data acquisition apparatus. The recorder 2 receives measurement data from the input device 1 and writes the received measurement data to the internal storage means and saves the measurement data. The recorder 2 has a function of managing time, and when measuring data is saved, the recorder 2 associates the measurement data with the current time. In other words, the recorder 2 records the received measurement data in association with a received data sequential number and the current time managed by itself. The recorder 2 records, for example, information indicating that "measurement data n was received with a data sequential number N (N is an integer, for example) from the input device 1 at "time hh:mm:ss (hh indicates hour, mm indicates minute, ss indicates second)".

At the same time, the recorder 2 individually identifies the input device and records the identification information of the input device together as data. The recorder 2 also recognizes the period in which measurement data cannot be received from the input device 1 as a measurement data loss period, and records the measurement data loss information together as data. The measurement data loss information is information about the start time and end time of the measurement data loss period.

The PC 3 has a function of executing application 31 (application program). More specifically, the PC 3 includes a CPU (Central Processing Unit) for executing programs, a memory (main storage device), and peripheral devices. The application 31 combines data obtained from the input device 1 and data obtained from the recorder 2 and outputs a combined data file 63. With this mechanism, the application 31 supplements the loss data in the measurement data obtained from the recorder 2 with the measurement data obtained from the input device 1. In other words, the application 31 combines the complete measurement data file by supplementing the data of the data loss period in the recorder 2 with the recorded data held by the input device 1. Note that combining of data means processing to generate new data based on the first data and the second data. The new data obtained through combining includes the information included in the first data and the information included in the second data. Also, combining of data is performed based on mutual relationship inherent between the first data and the second data. In addition, the above "complete measurement data file" is a file that holds the measurement data of the state without lost measurement data.

Next, a further detailed functional configuration of each device constituting the data acquisition system 70 will be described.

As shown in FIG. 1, the input device 1 includes a data measurer 11, a data recorder 12, and an internal memory 13.

The data measurer 11 performs measurement with the measurement sensor 5 and obtains measurement data. The data measurer 11 generates a data sequential number for one piece of obtained measurement data. The data sequential number is an integer data which is sequentially counted up every time the data measurer 11 performs measurement. The data measurer 11 holds and manages the measurement data and the data sequential number in association with each other. The data measurer 11 holds information such as "the value of the measurement data whose data sequential number is 12345 is 199.98", for example. The data measurer 11 passes data sequential number and measurement data to data recorder 12. The data measurer 11 transmits the data sequential number and the measurement data to the recorder 2 by means of wireless communication or the like.

That is, the data measurer 11 acquires the measurement data by measuring the physical quantity and the like, and generates the data sequential number representing the order in the acquired measurement data. In addition, the data measurer 11 transmits the measurement data and the data sequential number to the recorder 2.

Meanwhile, the data measurer 11 performs measurement at a preset time interval (for example, with an interval of one second) and transmits the measurement data and the data sequential number to the recorder 2.

In a case where transmitting the measurement data and the data sequential number to the recorder 2, the data measurer 11 transmits input device identification information for identifying the input device 1 itself.

The data recorder 12 writes the data sequential number and the measurement data received from the data measurer 11 to the internal memory 13 in a mutually associated manner.

The internal memory 13 is for storing the data sequential number and the measurement data. The internal memory 13 is realized by using, for example, a semiconductor memory, a magnetic storage device or the like.

The recorder 2 includes a data collector 21, a data recorder 22, an internal memory 23, a file generator 24, and a time manager 25.

The data collector 21 receives the measurement data and the data sequential number from the input device 1.

In addition, the data collector 21 receives from the time manager 25 information about time indicating the time of reception of the measurement data and the like (referred to as "data time"). The data collector 21 associates the data time with the measurement data and the data sequential number received from the input device 1 and passes them to the data recorder 22.

The data collector 21 holds the information for the time interval (for example, interval of one second explained above) with which the input device 1 transmits the measurement data according to a previously configured setting value. In a case where the measurement data from the input device 1 is not received according to this time interval (the length of this time is a previously configured data loss detection time), the data collector 21 recognizes that this is measurement data loss, and notifies the data recorder 22 that an event of measurement data loss has occurred. That is, the data collector 21 generates measurement data loss information in a case where a pair of measurement data and data sequential number cannot be received from the input device 1 even after a predetermined time interval (data loss detection time) has elapsed.

That is, the data collector 21 receives a pair of the measurement data and the data sequential number transmitted from the input device 1, generates the time information associated with the measurement data and the data sequential number having been received, and generates measurement data loss information about a pair of the measurement data and the data sequential number that could not be received from the input device 1.

The data collector 21 also receives the input device identification information transmitted from the input device 1.

The data recorder 22 writes the measurement data, the data sequential number, and the data time passed from the data collector 21 in the internal memory 23 in association with each other.

In addition, in a case where the measurement data loss phenomenon is notified from the data collector 21, the data recorder 22 writes the measurement data information in the internal memory 23 based on the notification. Specifically, the data recorder 22 writes the start time and the end time of the measurement data loss period in the internal memory 23.

The internal memory 23 stores information about the measurement data, data sequential number, data time, and data loss period. In addition, the internal memory 23 stores the input device identification information about the input device 1 in association with the measurement data and the like. The internal memory 23 is realized by using, for example, a semiconductor memory, a magnetic storage device or the like.

In other words, the internal memory 23 stores pairs of measurement data and data sequential numbers associated with time information, and also stores measurement data loss information passed from the data collector 21.

The file generator 24 generates a recorded data file 62 based on data such as measurement data held by the internal memory. The recorded data file 62 is a data file of a format readable by the PC 3.

The time manager 25 has a real time clock, and has a function of providing information about the current time to each unit in the recorder 2.

The application 31 runs on the PC 3, and is configured to include a data acquirer 36, a file generator 37, and a file combiner 38. In addition, the application 31 inputs and outputs data to and from the recorded data file 61, the recorded data file 62, and the combined data file 63.

The application 31 obtains data such as measurement data, data sequential number, input device identification information from the internal memory 13 of the input device 1, and converts the data into a data file. In addition, the application 31 has a function of setting the input device 1. In addition, the application 31 performs processing to combine the recorded data file 61 and the recorded data file 62. That is, the application 31 complements by inserting measurement data obtained from the recorded data file 61 in a place where the measurement data in the recorded data file 62 is lost (that is, a place where there is no data sequential number).

The data acquirer 36 takes measurement data, data sequential number, input device identification information from the internal memory 13 of the input device 1 and passes them to the file generator 37.

For example, the data acquirer 36 reads information from the internal memory 13 by a serial cable or a USB cable. The serial cable and the USB cable are an example of "first communication". Alternatively, the input device 1 may have a drive device, not shown, and the input device 1 may record information in the internal memory 13 to a removable recording medium such as an SD card with the drive device, and the data acquirer 36 may read information in the removable recording medium recorded by the input device 1 using a drive device, not shown, connected to the PC 3.

The file generator 37 generates the recorded data file 61 based on the measurement data, the data sequential number, and the input device identification information acquired by the data acquirer 36. The recorded data file 61 is a file in the file system on the operating system that manages the PC 3.

The file combiner 38 reads the recorded data file 61 generated by the file generator 37 and the recorded data file 62 passed from the recorder 2, and combines these files. For example, the file combiner 38 can read the recorded data file 62 by communicating with the recorder 2 via a wired LAN (Local Area Network) such as Ethernet or a wireless LAN such as WiFi. The wired LAN and the wireless LAN are an example of "second communication". Alternatively, the file combiner 38 may read information in the removable recording medium recorded by the recorder 2 using a drive device, not shown, connected to the PC 3. The file combiner 38 outputs a combined data file 63 as a combined file. Specifically, the file combiner 38 complements the measurement data in the measurement data loss period based on the measurement data loss information included in the recorded data file 62. The file combiner 38 acquires measurement data for complementation from the recorded data file 61. In a case where combining the recorded data file 62 and recorded data file 61, the file combiner 38 uses the data sequential number as a key. The file combiner 38 maintains the measurement data of the period other than the measurement data loss period in the recorded data file 62, and outputs the measurement data as it is to the combined data file 63. The details of file combining processing will be explained later with reference to the data example.

As described above, the recorded data file 62 is a data file output from the recorder 2. The recorded data file 61 is a data file generated by the application 31 using the measurement data obtained from the input device 1. The combined data file 63 is a data file which the file combiner 38 of the application 31 generates by combining the recorded data file 61 and recorded data file 62.

That is, the file combiner 38 acquires first data from the input device 1. In the first data, measurement data which is data measured in the input device 1 and a data sequential number representing the sequence of the measurement data are associated with each other. Then, the file combiner 38 acquires second data from the recorder 2. The second data includes a pair of measurement data and a data sequential number received by the recorder 2 from the input device 1, time information generated by the recorder 2 in association with the pair, and data loss information indicating that the recorder 2 receives a pair of measurement data and a data sequential number from the input device 1. In addition, the file combiner 38 collates the data sequential number included in the first data with the data sequential number included in the second data, thereby replacing the measurement data loss information with the measurement data and the data sequential number in the first data which are associated as a result of the collation. Therefore, the file combiner 38 generates a combined data file 63 in which the first data and the second data are combined.

The file combiner 38 generates a combined data file 63 based on the first data and the second data associated with the same input device identification information.

Next, overview of the data configuration used in the data acquisition system 70 will be described. FIG. 2 is a schematic diagram illustrating overview of the configuration of each data according to the present embodiment.

In FIG. 2, "(1) INTERNAL MEMORY (OF INPUT DEVICE)" illustrates overview of the data configuration held by the internal memory 13 of the input device 1. As illustrated in FIG. 2, the internal memory 13 can store a plurality of items of data in which data sequential number and measurement data are associated with each other.

In FIG. 2, "(2) INTERNAL MEMORY (OF RECORDING DEVICE)" illustrates overview of the data configuration held by the internal memory 23 of the recorder 2. As illustrated in FIG. 2, the internal memory 23 can store a plurality of items of data in which a data time, a data sequential number, and measurement data are associated with each other. In a case where measurement data loss period exists, the internal memory 23 stores measurement data loss information.

In FIG. 2, "(3) RECORDED DATA FILE (OF RECORDING DEVICE)" illustrates overview of the data configuration of the recorded data file 62 output from the recorder 2. As illustrated in FIG. 2, the recorded data file 62 holds a plurality of items of data in which a data time, input device identification information, a data sequential number, and measurement data are associated with each other. Also, if there is a data loss period, the recorded data file 62 holds measurement data loss information.

In FIG. 2, "(4) RECORDED DATA FILE (OF INPUT DEVICE)" illustrates overview of the data configuration of the recorded data file 61 generated using the measurement data acquired from the input device 1. As illustrated in FIG. 2, the recorded data file 61 holds input device identification information. The recorded data file 61 holds multiple items of data in which a data sequential number and measurement data are associated with each other.

In FIG. 2, "(5) COMBINED DATA FILE" illustrates overview of the data configuration of the combined data file 63. As illustrated in FIG. 2, the combined data file 63 holds a plurality of items of data in which a data time, input device identification information, a data sequential number, and measurement data are associated with each other. Also, the combined data file 63 holds measurement data loss information.

Next, the procedure of processing in each device in the data acquisition system 70 will be described.

Figure 3:
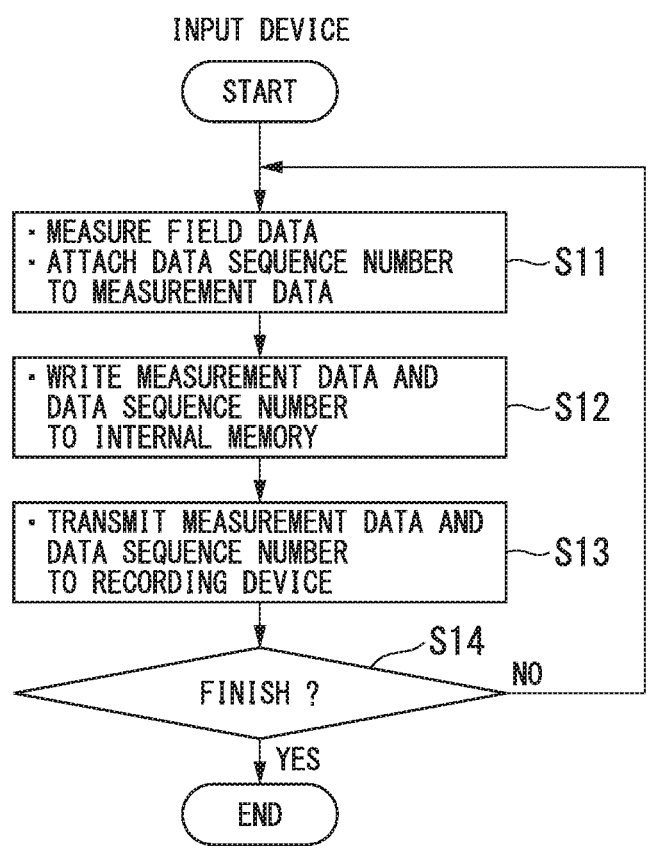
FIG. 3 is a flowchart illustrating a procedure of processing by an input device according to the embodiment.

FIG. 3 is a flowchart illustrating a procedure of processing by the input device 1. Hereinafter, the procedure of processing will be explained with reference to the flowchart.

In step S11, the data measurer 11 of the input device 1 measures field data and generates a data sequential number corresponding to the obtained measurement data.

In step S12, the data recorder 12 of the input device 1 writes the measurement data and its data sequential number passed from the data measurer 11 to the internal memory 13. Here, the data written by the data recorder 12 in the internal memory 13 is the measurement data obtained by the measurement in step S11 and the data sequential number generated in step S11. In step S13, the data recorder 12 of the input device 1 transmits the measurement data and the data sequential number to the recorder 2. Here, the data that the data recorder 12 transmits to the recorder 2 is the measurement data obtained by the measurement in step S11 and the data sequential number generated in step S11.

In step S14, the input device 1 determines whether or not a predetermined termination condition for ending the measurement processing is satisfied. In a case where the termination condition is satisfied (step S14:YES), the input device 1 terminates the processing of this flowchart. In a case where the termination condition is not satisfied (step S14:NO), the input device 1 returns to step S11. At this time, the input device 1 waits for a previously configured time interval (this time interval is equal to the data loss detection time or close to the data loss detection time), and then returns to step S11.

Figure 4:
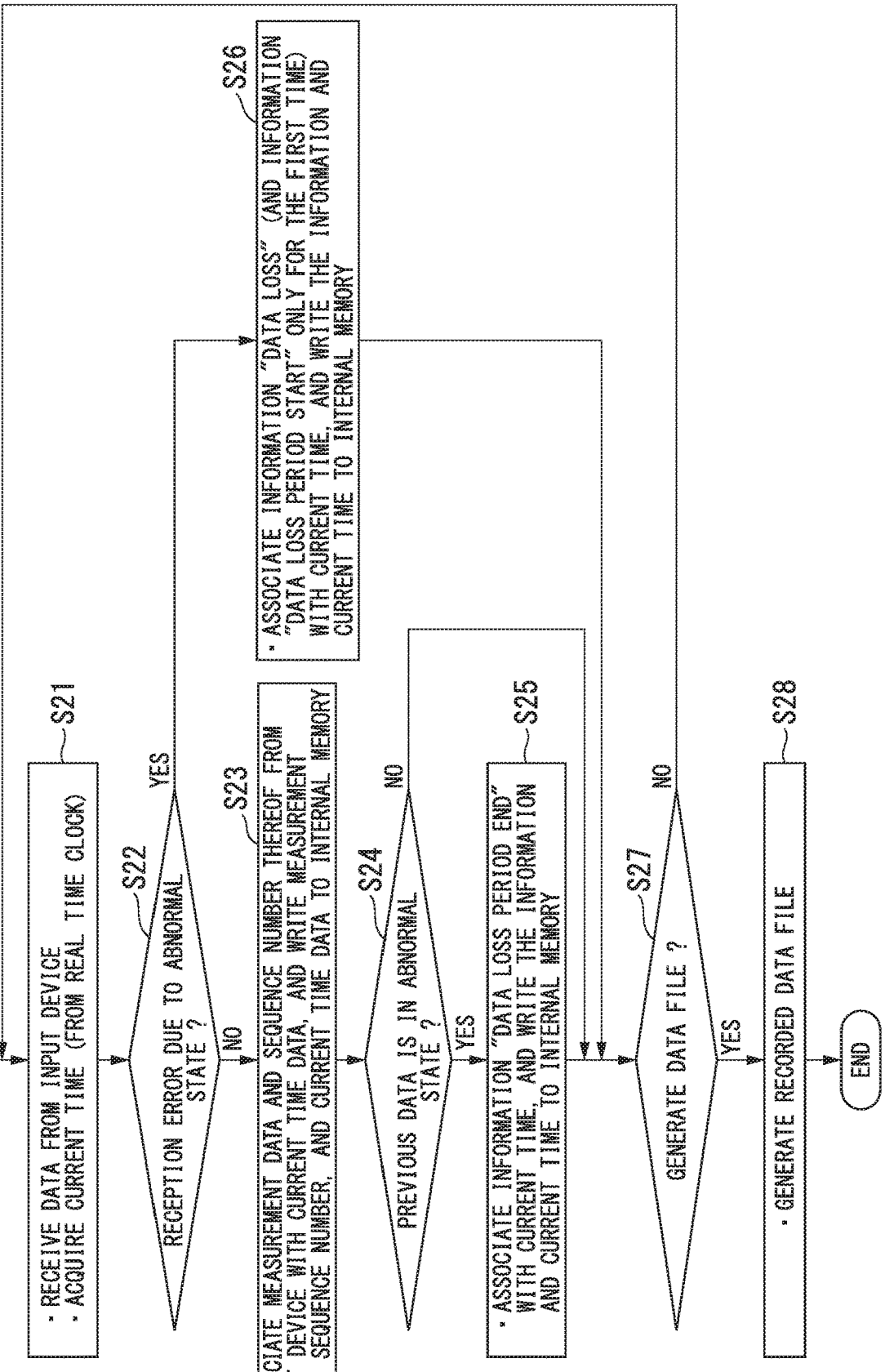
FIG. 4 is a flowchart illustrating a procedure of a process by a recorder according to the embodiment.

FIG. 4 is a flowchart illustrating the procedure of processing by the recorder 2. Hereinafter, the procedure of processing will be explained with reference to the flowchart.

In step S21, the data collector 21 of the recorder 2 receives the measurement data transmitted from the input device 1 via radio communication, and acquires the current time from the time manager 25.

In step S22, the data collector 21 determines whether or not a reception error due to an abnormal state (occurrence of data loss due to elapse of a predetermined data loss detection time) has occurred during data reception in step S21. In a case where a reception error is determined to have occurred (step S22:YES), the process proceeds to step S26. In a case where a reception error is determined not to have occurred r (step S26:NO), the process proceeds to step S23.

In step S23, the data recorder 22 writes the measurement data and its data sequential number received from the data collector 21 into the internal memory 23 in association with the current time data received from the data collector 21.

In step S24, the data recorder 22 determines whether or not the previous data written in the internal memory 23 indicates an abnormal state (whether or not the last data is information about "data loss"). In a case where the previous data is in the abnormal state (step S24:YES), the processing proceeds to step S25. In a case where the previous data is not in the abnormal state (step S24:NO), step S25 is skipped, and the processing proceeds to step S27.

In step S25, the data recorder 22 writes the information about "data loss period end" into the internal memory 23 in association with the acquired current time. The information about "data loss period end" is associated with at least one "data loss period start".

In a case where proceeding from step S22 to step S26, the data recorder 22 writes into the internal memory 23 information about "data loss" and information about "data loss period start" only for the first time in association with the acquired current time in step S26. After the processing of step S26 is completed, the process proceeds to step S27.

In step S27, the data collector 21 determines whether data reception is to be ended. In a case where data reception is to be ended, the procedure proceeds to the generation of the recorded data file 62. In a situation where data reception is to be ended and the recorded data file 62 is to be generated (step S27:YES), the processing proceeds to step S28. In a case where data reception is not to be ended (step S27:NO), the processing returns to step S21.

In step S28, the file generator 24 of the recorder 2 generates the recorded data file 62 based on the information held by the internal memory 23.

Note that the recorder 2 also writes the information for identifying the input device 1 of the measurement data transmission source into the internal memory 23 and the recorded data file 62.

In the processing of the flowchart shown in FIG. 4, the recorder 2 receives measurement data with the previously configured time interval and writes the measurement data into the internal memory 23 in a situation where there is no data reception error. In a case where there is an error of measurement data reception (abnormal state), the recorder 2 writes information about "data loss period start" into the internal memory 23. In a case of recovering from the measurement data reception error, the recorder 2 writes, into the internal memory 23, information about "data loss period end" and the measurement data received at that time. Finally, the recorder 2 generates the recorded data file 62.

Figure 5:
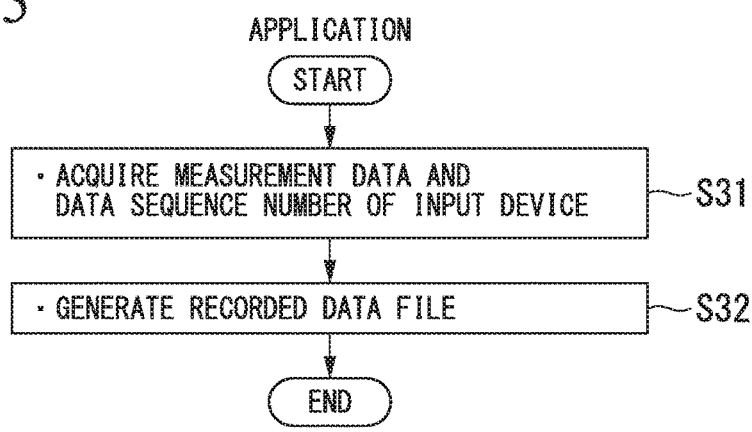
FIG. 5 is a flowchart illustrating a procedure of processing by an application running on a PC according to the embodiment.

FIG. 5 is a flowchart illustrating a procedure of processing performed by the data acquirer 36 and file generator 37 of the application 31 running on the PC 3.

In step S31, the data acquirer 36 of the application 31 acquires a set of pairs of the measurement data and the data sequential number from the input device 1. The data acquirer 36 passes to the file generator 37 the acquired set of pairs of the measurement data and the data sequential number.

In step S32, the file generator 37 generates a recorded data file 61 including the data passed from the data acquirer 36 in step S31.

As described above, in the processing illustrated in FIG. 3, FIG. 4, and FIG. 5, the recorded data files 61 and 62 are generated by cooperation of the respective devices.

Figure 6:
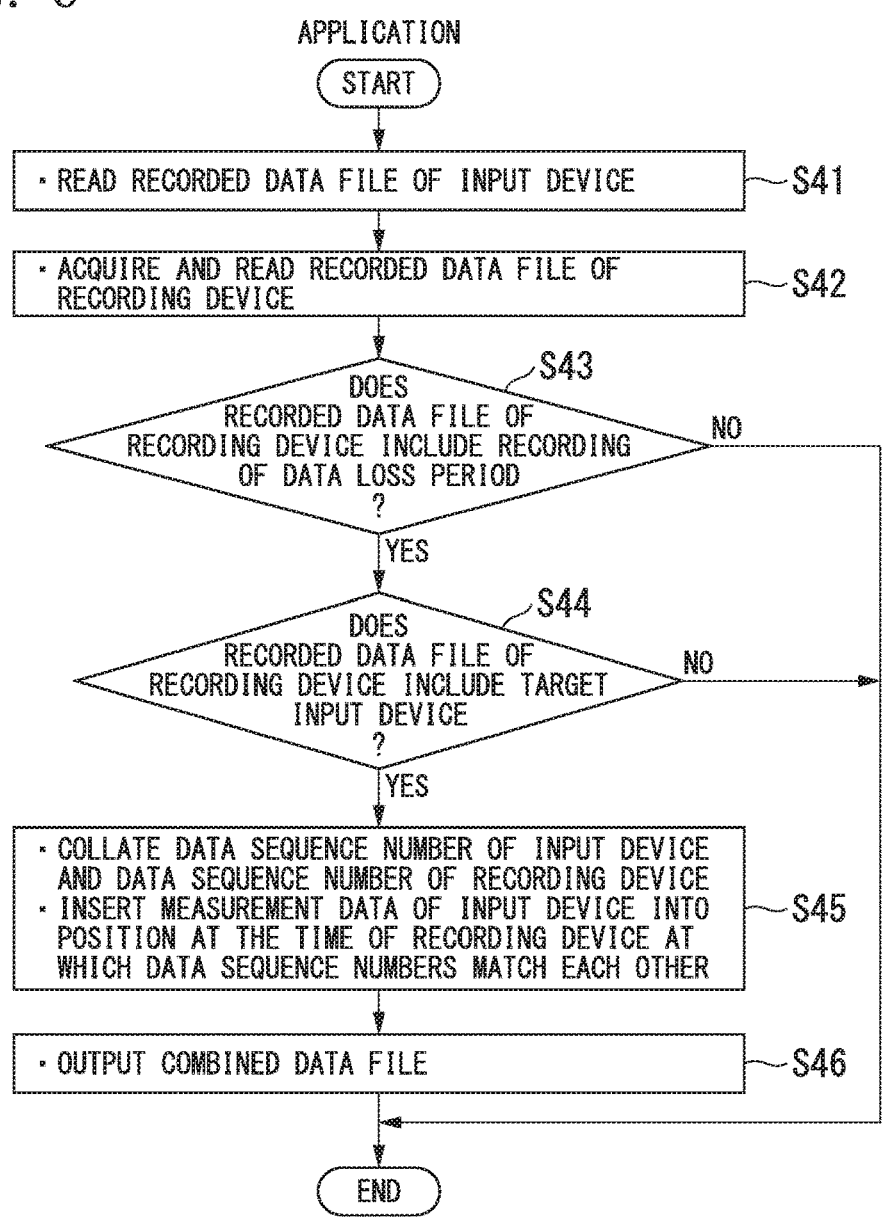
FIG. 6 is a flowchart illustrating a procedure of a processing in which an application running on a PC according to the embodiment combines the recorded data files of the input device and the recorder to generate a combined data file.

FIG. 5 illustrates the processing procedure of the only data acquirer 36 and the file generator 37 in the application 31, as described above. The processing procedure of the file combiner 38 in the application 31 is illustrated in FIG. 6. The processing of FIG. 6 may be executed immediately after processing of FIG. 5, or the processing of FIG. 5 and the processing of FIG. 6 may be executed at different timings.

FIG. 6 is a flowchart illustrating a procedure of processing in which the file combiner 38 of the application 31 running on the PC 3 combines the recorded data files 61 and 62 to generate a combined data file 63. Hereinafter, the procedure of processing will be explained with reference to the flowchart.

In step S41, the file combiner 38 of the application 31 reads the recorded data file 61 having measurement data of the input device 1.

In step S42, the file combiner 38 acquires and reads the recorded data file 62 output from the recorder 2.

In step S43, the file combiner 38 determines whether there is measurement data loss information in the recorded data file 62 of the recorder 2. In a case where there is measurement data loss information (step S43:YES), the process proceeds to step S44. In a case where there is no measurement data loss information (step S43:NO), it is unnecessary to supplement the measurement data of the measurement data loss period, and accordingly, the processing of this flowchart is terminated.

In step S44, the file combiner 38 determines whether measurement data of the input device of the combining target exists in the recorded data file 62 of the recorder 2. More specifically, the file combiner 38 makes determination based on the information of the input device identification in the recorded data file 62. In a case where the measurement data of the input device of the combining target exists (step S44:YES), the process proceeds to next step S45. In a case where the measurement data of the input device of the combining target does not exist (step S44:NO), the entire processing of this flowchart is terminated.

In step S45, the file combiner 38 collates the data sequential number between the recorded data file 61 of the input device 1 and the recorded data file 62 of the recorder 2. Then, the file combiner 38 embeds the measurement data of the recorded data file 61 into the data in the measurement data loss period in the recorded data file 62. More specifically, the file combiner 38 refers to a series of data sequential numbers including before and after the measurement data loss period in the recorded data file 62. Also, the file combiner 38 estimates the data sequential number corresponding to the measurement data loss period included in the recorded data file 62 among the data sequential numbers included in the recorded data file 61. This estimation is possible since the data sequential number is an integer data each of which is expected to be incremented by one. Based on this estimation result, the file combiner 38 fills the data in the measurement data loss period in the recorded data file 62 with the measurement data in the recorded data file 61. As a result, the measurement data of the measurement data loss period in the recorded data file 62 is supplemented.

Even in a case where there are multiple pieces of measurement data loss information corresponding to a plurality of measurement data loss periods in the recorded data file 62, the file combiner 38 also complements the measurement data of all of these measurement data loss periods.

Also, even if the recorded data file 62 contains measurement data loss information, the file combiner 38 according to the present embodiment makes use of the fact, as a presumption, a single piece of data in the recorded data file 61 and a single piece of data in the recorded data file 62 are generated at substantially the same timing. This is realizable because the recorder 2 holds the information about the cycle (time interval) during which the input device 1 measures data and the recorder 2 writes the measurement data loss information into the recorded data file 62 according to the cycle. That is, even during the measurement data loss period, a single piece of data in the recorded data file 61 and a single piece of data in the recorded data file 62 can be associated one to one.

However, more generally, the file combiner 38 may use an algorithm for collation between two series data including mismatch so that a single piece of data in the recorded data file 61 and a single piece of data in the recorded data file 62 are associated with each other. Such a collation algorithm can be implemented by generally available techniques.

In step S46, the file combiner 38 outputs combined data, i.e., data in which measurement data of measurement data loss period is complemented, as the combined data file 63.

Hereinabove, the processing of file combining performed by the application 31 is finished.

Next, the flow of data accompanying the processing flow within the data acquisition system 70 will be described.

FIG. 7, FIG. 8, FIG. 9, FIG. 10, and FIG. 11 are schematic diagrams illustrating states of the internal memory 13 of the input device 1, and states of the internal memory 23 of the recorder 2 in each situation in progress. As illustrated in these figures, the internal memory 13 of the input device 1 stores data in a table format, and the table has items, i.e., data sequential number and measurement data. In addition, the internal memory 23 of the recorder 2 stores data in a table format, and the table includes data time, device identification, CH1 data, and CH2 data. Here, "CH" stands for channel. CH1 data is an item for storing a data sequential number. CH2 data is an item for storing measurement data.

FIG. 7 illustrates a state in which the input device 1 performs data measurement and one piece of measurement data is written in the internal memory 13. In this example, the input device 1 measures the temperature. In the internal memory 13 of the input device 1, one piece of data is written, of which data sequential number is 1, and measurement data is "23.5° C.".

Next, the input device 1 transmits measurement data to the recorder 2. More specifically, the input device 1 transmits, to the recorder 2, a "device A" which is input device identification information of the input device 1, a data sequential number "1", and measurement data "23.5 degrees Celsius".

FIG. 8 illustrates a state in which the recorder 2 received the measurement data and wrote the measurement data in the internal memory 23. As illustrated in FIG. 8, the internal memory 23 stores one item of data. In the data, the data time is 00:00:01 (00:00:01), the device identification information is "device A", CH 1 data (data sequential number) is "1", and CH2 data (measurement data) is "23.5 degrees Celsius". The data time may be expressed in a form of "hh:mm:ss" (hour, minute, and second) or may be expressed in a form of "YYYY/MM/DD hh:mm:ss" (year, month, day, hour, minute, and second).

Next, after an elapse of a predetermined time interval (one second in this example), the input device 1 measures the second piece of data and writes the second piece of data in the internal memory 13. The input device 1 transmits the measurement data to the recorder 2. The recorder 2 writes the measurement data to the internal memory 23.

FIG. 9 illustrates a state at the time when the recorder 2 wrote the second item of measurement data to the internal memory 23. As illustrated in FIG. 9, in the internal memory 13 of the input device 1, a data sequential number "2" and measurement data "24.7 degrees Celsius" are additionally written. In the internal memory 23 of the recorder 2, data time "00:00:02", device identification "device A", CH1 data (data sequential number) "2", CH2 data (measurement data) "24.7 degrees Celsius" are additionally written.

In this example, next, it is assumed that the communication between the input device 1 and the recorder 2 is interrupted. That is, the input device 1 measures data and records the data in the internal memory 13, but the measurement data does not reach recorder 2.

FIG. 10 illustrates a state at the time when information about the third item and the fourth item of the measurement data are written in the internal memories 13 and 23, respectively. As illustrated in FIG. 10, in this state, the third item and the fourth item of data are written in the internal memory 13 of the input device 1. The third item of data has a data sequential number "3" and measurement data "24.0 degrees Celsius". The fourth item of data has a data sequential number "4" and measurement data "24.3 degrees Celsius". The recorder 2 has not yet received these third item and fourth measurement data. Since the recorder 2 recognizes that this is measurement data loss, in the internal memory 23 of the recorder 2, device identification "device A" and CH1 data "data loss" and CH2 data "data loss" are written in association with data time "00:00:03" and "00.00:04".

Thereafter, when the wireless communication between the input device 1 and the recorder 2 recovers, the recorder 2 receives the fifth item of measurement data from the input device 1.

FIG. 11 illustrates a state at the time when the fifth item of measurement data is written in the internal memory 13 and 23, respectively. As illustrated in FIG. 11, the data sequential number "5" and the measurement data "23.9 degrees Celsius" are written as the fifth item of data in the internal memory 13 of the input device 1. This data sequential number and this measurement data are also transmitted to the recorder 2. In the internal memory 23 of the recorder 2, data time "00:00:05", device identification "device A", CH1 data (data sequential number) "5", CH2 data (measurement data) "23.9 degrees Celsius" are recorded.

As described above, the data illustrated in FIG. 11 is obtained as a result of a series of phenomena. That is, in the internal memory 23 of the recorder 2, it is recorded that the data at the data time "00:00:03" and "00:00:04" are lost. Also, the data sequential numbers "3" and "4" at these times are lost in the internal memory 23. Meanwhile, in the internal memory 13 of the input device 1, the measurement data "24.0 degrees Celsius" and "24.3 degrees Celsius" are recorded in association with data sequential numbers "3" and "4", respectively.

Meanwhile, for data sequential number "6" and subsequent numbers, the measurement data can be recorded in both the internal memories 13 and 23 in a manner similar to the above.

Next, the details of the processing in which the file combiner 38 of the application 31 combines the recorded data files 61 and 62 will be described with reference to the data example.

Figure 12:
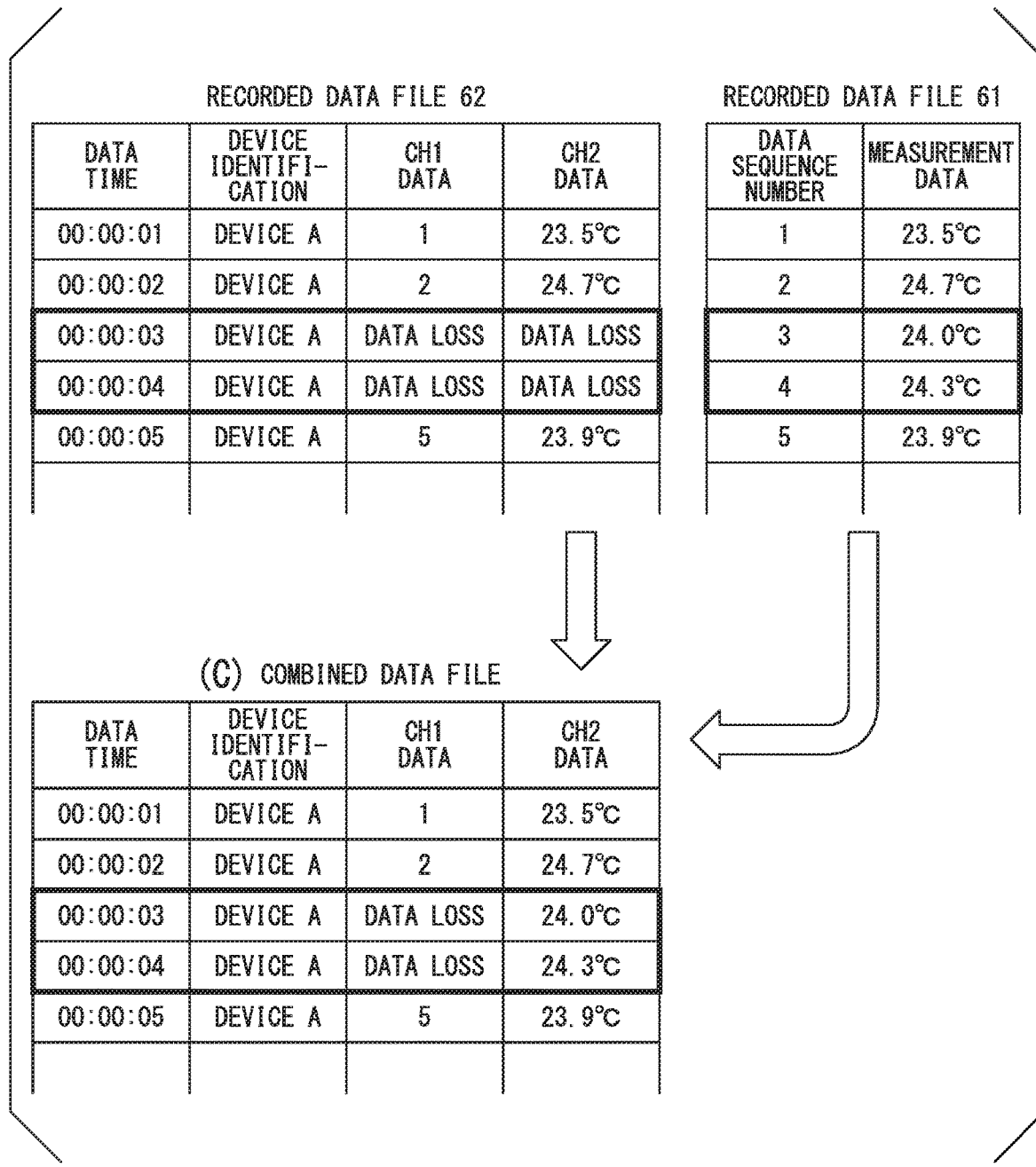
FIG. 12 is a schematic diagram illustrating a method of generating a combined data file according to the embodiment.

FIG. 12 is a schematic diagram illustrating a method of generating the combined data file 63.

As described above, the application 31 reads the measurement data stored in the internal memory 13 of the input device 1 and outputs the measurement data as the recorded data file 61. In addition, the recorder 2 generates and outputs the recorded data file 62 based on the measurement data stored in the internal memory 23. That is, the recorded data files 61 and 62 is a file holding the contents of the internal memories 13 and 23, respectively.

The file combiner 38 performs collation of the data sequential number between the recorded data files 61 and 62. As a result, in the illustrated example, it can be seen that measurement data exists in the recorded data files 61 and 62 for data sequential numbers "1", "2", and "5". In addition, the file combiner 38 detects that "3" and "4" of CH1 data (data sequential number) are lost in the recorded data file 62 (a portion indicated in a bold frame in the recorded data file 62). This detection is made possible by sequentially scanning CH1 data (data sequential number) in the recorded data file 62 from the beginning. In the case of sequentially scanning from the beginning, it is understood that "3" is data loss since data loss first appears in data subsequent to data in which CH1 data is "2". Since the next is also data loss, it is understood that "4" is data loss. The file combiner 38 detects that the measured data corresponding to the data sequential numbers "3" and "4" are included in the recorded data file 61 (in a portion indicated in a thick frame in the recorded data file 61). This detection is also made possible by sequentially scanning the data sequential number in the recorded data file 61 from the beginning. At this time, the file combiner 38 refers to the recorded data file 61 generated based on the measurement data of the corresponding input device 1 based on the device identification information "device A" in the measurement data loss period. Then, the file combiner 38 extracts two items of data corresponding to the measurement data loss period from the recorded data file 61. That is, the file combiner 38 extracts data including data sequential number "3" and measurement data "24.0 degrees Celsius", data including the data sequential number "4" and measurement data "24.3 degrees Celsius". Then, the file combiner 38 uses these two items of data extracted from the recorded data file 61 to complement the data loss portion in the recorded data file 62.

The data thus combined is the combined data file 63 of (C) in FIG. 12.

As shown in FIG. 12, as a result of complementing the measurement data, the third item of data in the combined data file 63 is data time "00:00:03", device identification "device A", CH1 data (data sequential number) "data loss", CH2 data (measurement data) "24.0 degrees Celsius". The fourth item of data in the combined data file 63 is data time "00:00:04", device identification "device A", CH1 data (data sequential number) "data loss", CH2 data (measurement data) 24.3 degrees Celsius".

In the present embodiment, in order to maintain measurement data loss information even after combining of file, CH1 data at data time "00:00:03" and "00:00:04" in the combined data file 63 is "data loss". When the file combiner 38 combines the file, the file combiner 38 can to acquire "3" and "4" as the data sequential number corresponding to these data times from the recorded data file 61, respectively. Therefore, the combined data file 63 may hold information about these data sequential numbers "3" and "4".

According to the present embodiment, the input device 1 holds the measurement data in the internal memory 13 and can use the measurement data held in the internal memory 13 to supplement the measurement data loss in the recorder 2. Therefore, there is no need to duplicate the recorder 2. In other words, the cost of the system can be reduced, and the labor required to maintain and manage the system can be reduced.

Also, according to the present embodiment, the input device 1 does not need to manage and save the time of measurement data. In other words, since the input device 1 does not need to implement electronic components (more specifically, clock device (real time clock) and the like) for managing the concept of time or a software program, the cost of the input device 1 can be reduced more greatly than when data is supplemented by relying on information about time. Further, the scale of the input device 1 can be reduced.

Also, according to the present embodiment, the identification information about the input device and the measurement data are held in association with each other. This gives the authenticity of data.

Also, according to the present embodiment, the recorder 2 grasps measurement data loss and the application 31 automatically supplements loss data. This makes it possible to operate the system at a low cost and to cope with the measurement data loss accurately.

Second Embodiment

Next, the second embodiment will be described. It should be noted that the explanation about matters already described in the first embodiment may be omitted below. This section focuses on items specific to the present embodiment.

Figure 13:
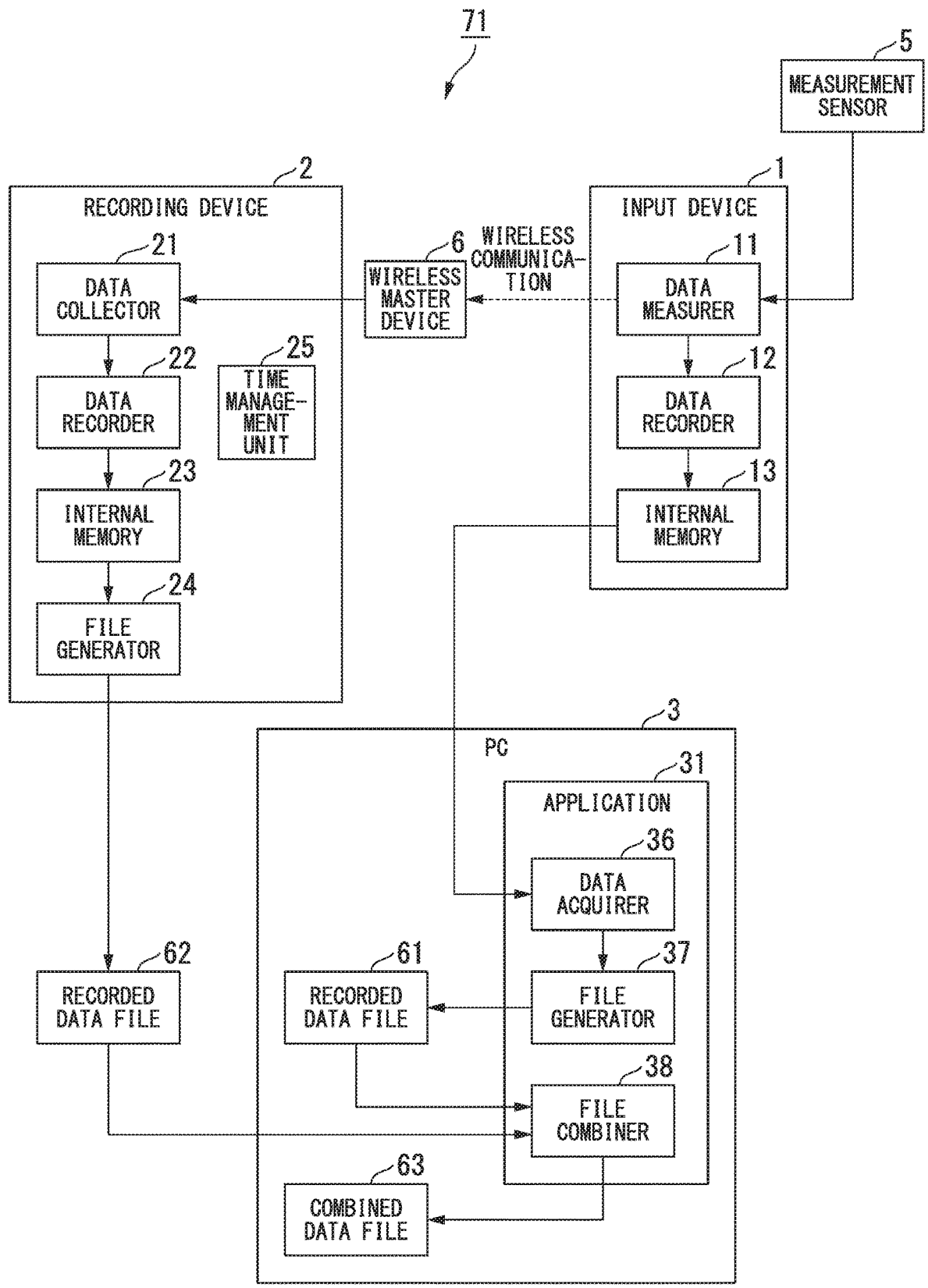
FIG. 13 is a block diagram illustrating a schematic functional configuration of a data acquisition system according to a second embodiment.

FIG. 13 is a block diagram illustrating a schematic functional configuration of a data acquisition system 71 according to the present embodiment. The feature of the present embodiment is that the data acquisition system 71 is configured to include a radio master device 6.

The radio master device 6 has a function of performing radio communication with the input device 1. Further, the radio master device 6 is connected to the recorder 2 by a medium such as a cable. The radio master device 6 receives the measurement data, the data sequential number, and the input device identification information from the input device 1 and passes the information to the recorder 2.

In the present embodiment, the input device 1 transmits measurement data, data sequential number, input device identification information to the radio master device 6 instead of directly to the recorder 2.

In addition, the recorder 2 receives data such as measurement data, data sequential number, input device identification information from the input device 1 from the radio master device 6.

Also, when an abnormal state occurs in the communication with the input device 1 and the measurement data cannot be received, the radio master device 6 recognizes the state as "measurement data loss" and also notifies "measurement data loss" state to the recorder 2. With this notification from radio master device 6, the recorder 2 can recognize the "data loss" state. The recorder 2 can grasp the start time and the end time of the measurement data loss period based on the notification of "measurement data loss" passed from the radio master device 6.

The other processing in the data acquisition system 71 is as described in the first embodiment.

Third Embodiment

Next, the third embodiment will be described. It should be noted that the explanation about matters already described in the first and second embodiments may be omitted below. This section focuses on items specific to the present embodiment.

Figure 14:
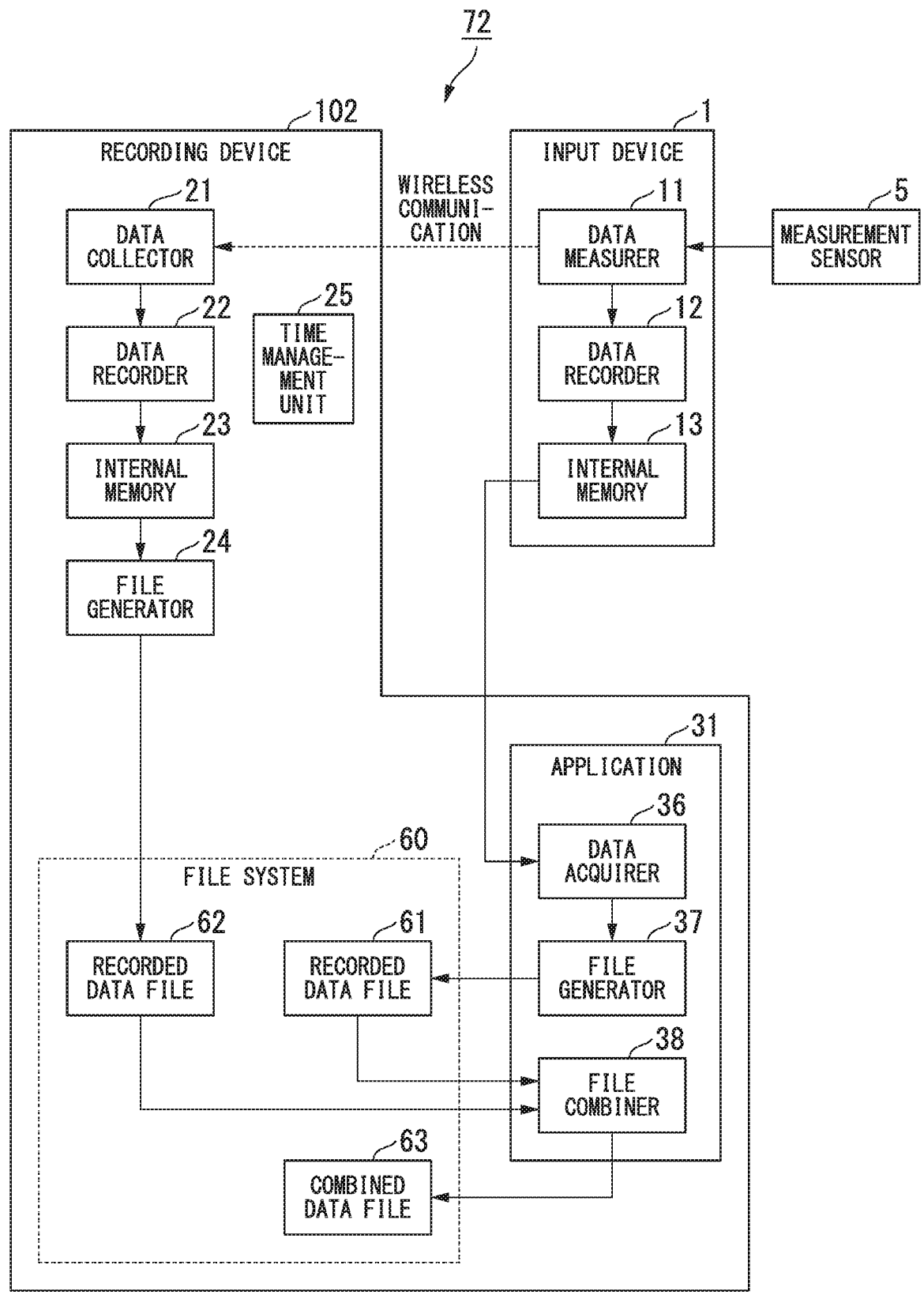
FIG. 14 is a block diagram illustrating a schematic functional configuration of a data acquisition system according to a third embodiment.

FIG. 14 is a block diagram illustrating a schematic functional configuration of a data acquisition system 72 according to the present embodiment. As illustrated in FIG. 14, the data acquisition system 72 is configured to include an input device 1 and a recorder 102.

The input device 1 and the measurement sensor 5 has the function as described in the first embodiment. In the present embodiment, the input device 1 transmits measurement data and the like to the recorder 102.

The recorder 102 is a device having the functions of the recorder 2 and the PC 3 explained in the first embodiment. The recorder 102 is a type of data acquisition apparatus.

More specifically, the recorder 102 includes a data collector 21, a data recorder 22, an internal memory 23, a file generator 24, a time manager 25, an application 31, and a file system 60. The data collector 21, the data recorder 22, the internal memory 23, the file generator 24, the time manager 25, and the application 31 respectively have the same functions as the functions described in the first embodiment.

The recorder 102 is realized by using, for example, a computer (a server type computer, a personal computer (PC), or the like). That is, for example, the functions of the data collector 21, the data recorder 22, the file generator 24, and the application 31 are realized by a program running on the CPU. The data collector 21 uses the wireless communication function of the computer. The time manager 25 includes a real time clock and has a function of returning the current time in response to a call from the above program.

Also, the file system 60 is realized as a part of the function of the operating system for managing the computer. The recorded data files 61 and 62 and the combined data file 63 are files on the file system 60.

As described above, the recorder 102 is a device obtained by integrating the recorder 2 and the PC 3 according to the first embodiment. The operation procedure and the like of the recorder 102 are as described in the first embodiment.

In addition to the computers in each of the above-described embodiments, the functions of the input device, the recorder (data acquisition apparatus), and the application on the PC may be realized by the computer system. In that case, the functions may be realized by recording a program for realizing the functions in a computer-readable recording medium, causing the computer system to read and execute the program recorded on the recording medium. It should be noted that the "computer system" mentioned here includes hardware such as an OS and peripheral devices.

Further, the "computer-readable recording medium" refers to a portable medium such as a flexible disk, a magneto-optical disk, a ROM, a CD-ROM, a DVD-ROM, a USB memory, or a storage device such as a hard disk built in a computer system. Further, the "computer-readable recording medium" refers to a medium that temporarily, dynamically holds a program such as a communication line for transmitting a program via a network such as the Internet or a communication line such as a telephone line, or may include those holding a program for a certain period of time such as a volatile memory of a computer system internal which may be a server or a client in that case. Further, the above-described program may be for realizing a part of the above-described functions, and may be one in which the above-described function can be realized by combining with the program already recorded in the computer system.

The PC 3 and the recorder 102 on which the application 31 runs in each of the above-mentioned embodiments may also be referred to as "data combining apparatus". The file combiner 38 may also be referred to as "data combiner". The combined data file 63 may also be referred to as "combined data".

The data sequential number in each of the above embodiments may also be referred to as "sequence information".

The internal memory 13 may also be referred to as "first storage". The data stored in the internal memory 13 may also be referred to as "first data".

The internal memory 23 may also be referred to as "second storage". The data stored in the internal memory 23 may also be referred to as "second data".

Although a plurality of embodiments have been described above, the present invention can be further implemented in the following modifications.

In each of the above embodiments, a data sequential number is used as information for representing a sequence of measurement data (temporal sequence). The data sequential number is integer information, and it increments by one. However, instead of the data sequential number, other sequence information for representing sequence may be used in general. The sequence information does not have to be data which increments by one as long as it is information uniquely representing sequence. For example, data may be incremented by n (n is an integer of 2 or more) or data decremented by m (m is an integer of 1 or more). Also, the sequence information may be information of numerical values other than integers or may be information of character strings.

In each of the above embodiments, measurement data is data indicating temperature. However, the measurement data may be a measurement value other than temperature. The measurement data may be a structure data composed of a plurality of data items (measurement items).

In each of the above embodiments, the input device, the recorder, and the PC (and application) performs processing for handing input device identification information. However, the data acquisition system may not use input device identification information. For example, if there is only one input device in the data acquisition system, there is no need to identify the input device.

Also, the master unit can collect measurement data from multiple input units, and the recorder can collect multiple pieces of measurement data.

In each of the above-described embodiments, the data collector 21 of the recorder 2 is configured such that when measurement data and data sequential number (sequence information) cannot be received from the input device 1 even after a predetermined time interval has elapsed, the data collector 21 of the recorder 2 recognizes that a measurement data loss has occurred, and generates measurement data loss information. Instead, when a situation occurs in which a data sequential number (sequence information) is missing in a series of data received from the input device 1, the data collector 21 recognizes measurement data loss, and generate measurement data loss information.

Although the embodiments of the present invention have been described above in detail with reference to the drawings, the specific configuration is not limited to this embodiment, and the present invention includes designs and the like within the scope not departing from the gist of the present invention.

The present invention can be used, for example, for plant and plant control. However, the scope of use of the present invention is not limited to those exemplified here.

Directional terms such as front, back, above, downward, right, left, vertical, horizontal, below, transverse, row, and column as well as any other similar directional terms refer to directions with respect to a device in question. Accordingly, it is to be understood that these terms be interpreted relative to a device in question.

The term "configured" is used to describe a component, unit, or part of a device includes hardware and/or software that is constructed and/or programmed to carry out the desired function.

It is to be understood that terms that are expressed as "means-plus function" in the claims include any structure that can be utilized to carry out the function of the terms.

A term "unit" is used to describe a component, unit, or part of a piece of hardware and/or software that is constructed and/or programmed to carry out the desired function. Typical examples of the hardware may include, but are not limited to, a device and a circuit.

While preferred embodiment of the present invention has been described and illustrated above, it should be understood that these are examples of the present invention and are not to be considered as limiting. Additions, omissions, substitutions, and other modifications can be made without departing from the scope of the present invention. Accordingly, the present invention is not to be considered as being limited by the foregoing description, and is only limited by the scope of the claims.

What is claimed is:

1. A data acquisition system comprising an input device, a data acquisition apparatus, and a data combining apparatus, wherein the input device comprises:
        a data measurer that is implemented by a hardware-processor and configured to acquire measurement data by performing measurement, generate sequence information representing a sequence of the acquired measurement data, and transmit first data including the measurement data and the sequence information in association with each other, to the data acquisition apparatus; and
        a first storage that is implemented by a hardware-memory and configured to store the first data,
    wherein the data acquisition apparatus comprises:
        a data collector that is implemented by a hardware-processor and configured to, receive the first data including the measurement data and the sequence information in association with each other from the input device, generate time information in association with the measurement data and the sequence information and add the time information to each pair of the measurement data and the sequence information, and when the data collector fails to receive a pair of the measurement data and the sequence information from the input device, generate data loss information comprising information about a start time and an end time of a measurement data loss period in which a pair of the measurement data and the sequence information could not be received from the input device; and
        a second storage that is implemented by a hardware-memory and configured to store, as second data, the measurement data and the sequence information in association with the time information, and store the data loss information,
    wherein the data combining apparatus comprises:
        a data combiner that is implemented by a hardware-processor and configured to acquire the first data that is not associated with the time information and stored in the first storage, acquire the second data that is associated with the time information and the data loss information stored in the second storage, collate the first data and the second data based on the sequence information included in the first data and the sequence information included in the second data, identify from the collated sequence information, sequence information corresponding to the measurement data loss period based on the start time and the end time included in the data loss information, and insert, in the second data, measurement data in the first data that corresponds to the identified sequence information and that is not associated with the time information, thereby generating combined data obtained by combining the first data and the second data.

2. The data acquisition system according to claim 1, wherein the data measurer of the input device acquires the measurement data and transmits the measurement data and the sequence information to the data acquisition apparatus with a predetermined time interval, and
    the data collector of the data acquisition apparatus generates the data loss information when the measurement data and the sequence information cannot be received from the input device even after the predetermined time interval.

3. The data acquisition system according to claim 1, wherein the data collector of the data acquisition system generates the data loss information when a situation occurs in which the sequence information received from the input device is missing.

4. The data acquisition system according to claim 1, wherein the data measurer of the input device transmits input device identification information for identifying the input device when the measurement data and the sequence information are transmitted to the data acquisition apparatus,
    the data collector of the data acquisition apparatus also receives the input device identification information transmitted from the input device,
    the second storage of the data acquisition apparatus stores the input device identification information in association with the measurement data, the sequence information, and the data loss information, and
    the data combiner of the data combining apparatus generates the combined data based on the first data and the second data associated with the same input device identification information.

5. The data acquisition system according to claim 1, wherein the data combiner of the data combining apparatus acquires the second data stored in the second storage by communicating with the data acquisition apparatus by a second communication,
    the data combiner of the data combining apparatus acquires the first data stored in the first storage by reading the first data recorded on a recording medium by the input device.

6. The data acquisition system according to claim 1, wherein the data combiner of the data combining apparatus acquires the second data stored in the second storage by communicating with the data acquisition apparatus by a second communication,
    the data combiner of the data combining apparatus acquires the first data stored in the first storage by communicating with the input device apparatus by a first communication different from the second communication.

7. The data acquisition system according to claim 6, wherein the second communication is performed via a wired local area network or a wireless local area network, the first communication is performed with a serial cable or a USB cable.

8. The data acquisition system according to claim 6, wherein the input device transmits the measurement data and the sequence information by a third communication different from the first and second communications.

9. The data acquisition system according to claim 8, wherein the third communication is Low-Power Wide-Area Network.

10. The data acquisition system according to claim 1, wherein the data combiner of the data combining apparatus acquires the second data stored in the second storage by reading the second data recorded on a recording medium by the data acquisition apparatus.

11. The data acquisition system according to claim 1, wherein the input device transmits the first data to the data acquisition apparatus in real time as the measurement data is being measured.

12. The data acquisition system according to claim 11, wherein the data acquisition apparatus comprises a real time clock, and the data collector generates the time information for each pair of the measurement data and the sequence information using the real time clock as the first data is received.

13. The data acquisition system according to claim 11, wherein the data acquisition apparatus comprises a clock for generating the time information, and the input device does not include a clock for generating time information.

14. The data acquisition system according to claim 1, wherein the measurement data comprises one or more of a voltage, a current, a power, a magnetism, a temperature, a humidity, a pressure, a velocity, a fluid flow rate, and a liquid volume.

15. The data acquisition system according to claim 1, wherein the input device, the data acquisition apparatus, and the data combining apparatus are installed in a plant and the input device is measures field data associated with an equipment in the plant.

16. A data combining apparatus comprising:
a data combiner that is implemented by a hardware-processor and configured to acquire first data comprising measurement data and sequence information in association with each other, the first data being not associated with time information, the measurement data being data obtained through measurement, and the sequence information representing a sequence of the measurement data,
the data combiner configured to acquire second data comprising the measurement data and sequence information in association with each other and, for each pair of the measurement data and sequence information, time information in association with the measurement data and sequence information, and acquire data loss information comprising information about a start time and an end time of a measurement data loss period in which a pair of the measurement data and the sequence information could not be received,
the data combiner configured to collate the first data and the second data based on the sequence information included in the first data and the sequence information included in the second data, identify from the collated sequence information, sequence information corresponding to the measurement data loss period based on the start time and the end time included in the data loss information, and insert, in the second data, measurement data from the first data that corresponds to the identified sequence information and that is not associated with the time information, thereby generating combined data obtained by combining the first data and the second data.

17. The data combining apparatus according to claim 16, wherein the measurement data is acquired and the measurement data and the sequence information are transmitted to the data acquisition apparatus with a predetermined time interval, and
the data loss information is written to the second data when the measurement data and the sequence information cannot be received even after the predetermined time interval.

18. The data combining apparatus according to claim 16, wherein the data loss information is written to the second data when a situation occurs in which the sequence information is missing.

19. The data combining apparatus according to claim 16, wherein the first data includes input device identification information for identifying an input device in association with the measurement data, the sequence information, and the data loss information, and
the data combiner generates the combined data based on the first data and the second data associated with the same input device identification information.

20. The data combining apparatus according to claim 16, wherein the data combiner of the data combining apparatus acquires the second data stored in the second storage by communicating with the data acquisition apparatus by a second communication,
the data combiner of the data combining apparatus acquires the first data stored in the first storage by reading the first data recorded on a recording medium by the input device.

* * * * *